(12) United States Patent
Nelson, III et al.

(10) Patent No.: US 11,506,522 B2
(45) Date of Patent: Nov. 22, 2022

(54) SOLAR SHIELD FOR UTILITY METER

(71) Applicant: Itron, Inc., Liberty Lake, WA (US)

(72) Inventors: Kirby Kimble Nelson, III, Seneca, SC (US); Jaykumar Harshadbhai Joshi, Pendleton, SC (US)

(73) Assignee: Itron, Inc., Liberty Lake, WA (US)

( * ) Notice: Subject to any disclaimer, the term of this patent is extended or adjusted under 35 U.S.C. 154(b) by 438 days.

(21) Appl. No.: 16/528,367

(22) Filed: Jul. 31, 2019

(65) Prior Publication Data

US 2021/0033431 A1 Feb. 4, 2021

(51) Int. Cl.
*G01D 11/24* (2006.01)
*G01D 4/00* (2006.01)

(52) U.S. Cl.
CPC .............. *G01D 11/24* (2013.01); *G01D 4/00* (2013.01)

(58) Field of Classification Search
CPC .................................. G01D 11/24; G01D 4/00
See application file for complete search history.

(56) References Cited

U.S. PATENT DOCUMENTS

| | | | | |
|---|---|---|---|---|
| 4,618,071 A | * | 10/1986 | Vincent | H05K 5/02 220/371 |
| 5,774,328 A | * | 6/1998 | Rector | H02B 1/03 324/156 |
| 7,656,649 B2 | * | 2/2010 | Loy | G01R 22/065 361/659 |
| 2004/0225471 A1 | * | 11/2004 | Tate | G01D 11/24 702/150 |
| 2011/0069434 A1 | * | 3/2011 | Guillot-Jerome | G01D 4/002 361/679.01 |
| 2011/0259903 A1 | * | 10/2011 | Messner | H05K 5/03 220/694 |
| 2015/0140669 A1 | | 5/2015 | Boehm et al. | |

(Continued)

FOREIGN PATENT DOCUMENTS

CN 108282981 7/2018
DE 102018206292 7/2019
(Continued)

OTHER PUBLICATIONS

PCT Search Report and Written Opinion dated Oct. 16, 2020 for PCT Application No. PCT/US2020/044602, 29 pages.
(Continued)

*Primary Examiner* — Jamel E Williams
(74) *Attorney, Agent, or Firm* — Lee & Hayes, P.C.

(57) ABSTRACT

An enclosure for a utility metering device is configured to reduce internal air temperatures. In an example, the utility metering device has a solar shield and/or filtered ventilation air passage(s). In the example, an enclosure is attached to a base. Opening(s) may be defined in the enclosure, to allow air to remove heat from the metering device by convection. The openings may be covered with filters, to prevent the entry of water, dust, insects, etc. A solar shield may cover at least an upper surface of the enclosure. An air pocket may be defined between the solar shield and at least the upper surface of the enclosure. Air from within the enclosure may be ventilated into the air pocket, and air from within the air pocket may be ventilated into the atmosphere. The ventilation removes heat from within the enclosure, while the solar shield rejects addition of heat energy.

19 Claims, 9 Drawing Sheets

(56) References Cited

U.S. PATENT DOCUMENTS

| | | | |
|---|---|---|---|
| 2016/0025287 A1* | 1/2016 | Philhower | F21S 8/022 |
| | | | 362/183 |
| 2016/0252367 A1 | 9/2016 | Banhegyesi et al. | |
| 2018/0069380 A1 | 3/2018 | Giorgio | |
| 2019/0187335 A1 | 6/2019 | Nakayama | |
| 2021/0035241 A1 | 2/2021 | Nelson, III et al. | |
| 2021/0164806 A1* | 6/2021 | Fernandez | G01D 4/008 |

FOREIGN PATENT DOCUMENTS

| | | | | |
|---|---|---|---|---|
| KR | 102006573 | 8/2019 | | |
| WO | WO2011142685 | 11/2011 | | |
| WO | WO-2011142685 A2 * | 11/2011 | | H02G 3/14 |

OTHER PUBLICATIONS

Office Action for U.S. Appl. No. 16/528,384, dated Mar. 31, 2021, Nelson III, "Vented Utility Meter enclosure", 50 pages.
International Preliminary Report on Patentability for PCT Application No. PCT/US20/44602, dated Feb. 10, 2022.

* cited by examiner

SOLAR SHIELD FOR UTILITY METER

BACKGROUND

Electronic devices, such as electricity, gas and water meters, are frequently located in harsh environmental locations. In one example, electronic components within an enclosure generate heat. In some cases, high ambient air temperatures combine with bright sunlight to result in thermal stress to the electronic components. The space within metering devices is usually very restricted, which reduces design choices that might alleviate the thermal problem. Compounding these problems, the enclosures of some metering devices are made of polymeric materials that have limited thermal conductivity. Accordingly, heat-related degradation of the electronic components is a concern. In an example, elevation of component temperatures by ten degrees Centigrade can cause a significantly higher failure rate.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes a vented enclosure for a utility meter and an external solar shield for the enclosure. Each of the vented enclosure and the solar shield may be used individually or in combination with the other. In an example, the vented enclosure may include one or more vents, vent openings or holes, which allow air to enter, pass through, and exit from the enclosure. In some examples, at least two vent openings may be disposed in the enclosure, with a first vent opening in an upper half of the enclosure and a second vent opening in the lower half of the enclosure. The air movement through the enclosure cools components operating within the enclosure by convection. This may be particularly desirable if the enclosure is constructed of a material such as acrylic, polycarbonate or other plastics that are thermal insulators or only weakly thermally conductive.

In a further example, an external solar shield prevents sunlight from directly contacting an enclosure of a device, such as a utility meter, having internal electrical components. By preventing direct contact of sunlight with the enclosure, the internal electrical components operate at lower temperatures than would otherwise be the case. The solar shield may be located outside the enclosure and in a configuration that defines an air pocket between the solar shield and the vented enclosure. In some examples, the solar shield may provide one or more openings, allowing air transfer between the atmosphere and the air pocket. The air transfer removes heat from the utility meter by convection, resulting in a lower operating temperature for components within the enclosure and/or other portions of the utility meter.

Example System and Techniques

Figure 1A:
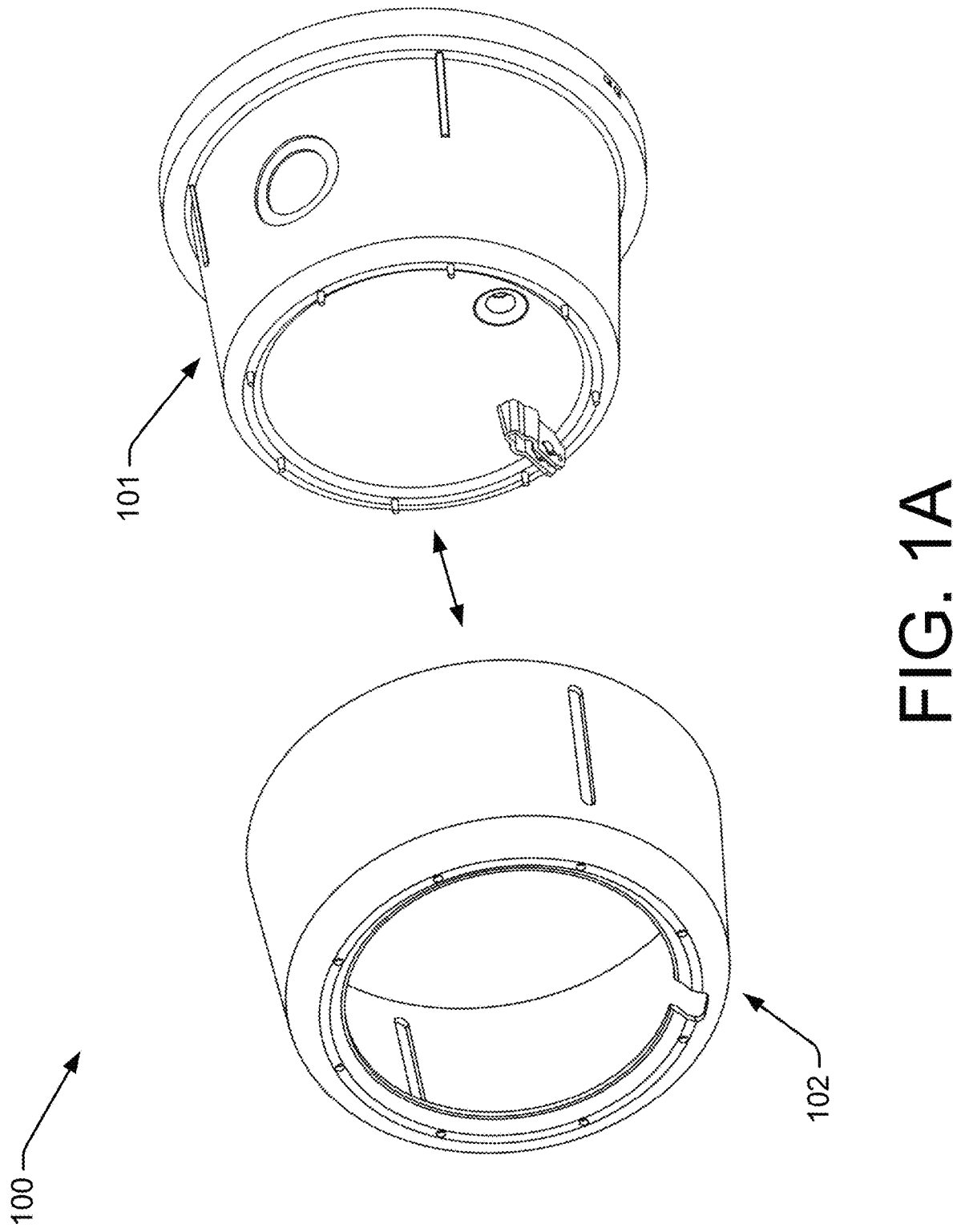
FIG. 1A is perspective view of an example of a metering device with a solar shield and an enclosure shown in an exploded configuration.

FIG. 1A shows an example of a metering device 100. In the example, the enclosure 101 and a solar shield 102 are shown in an exploded configuration.

Figure 1B:
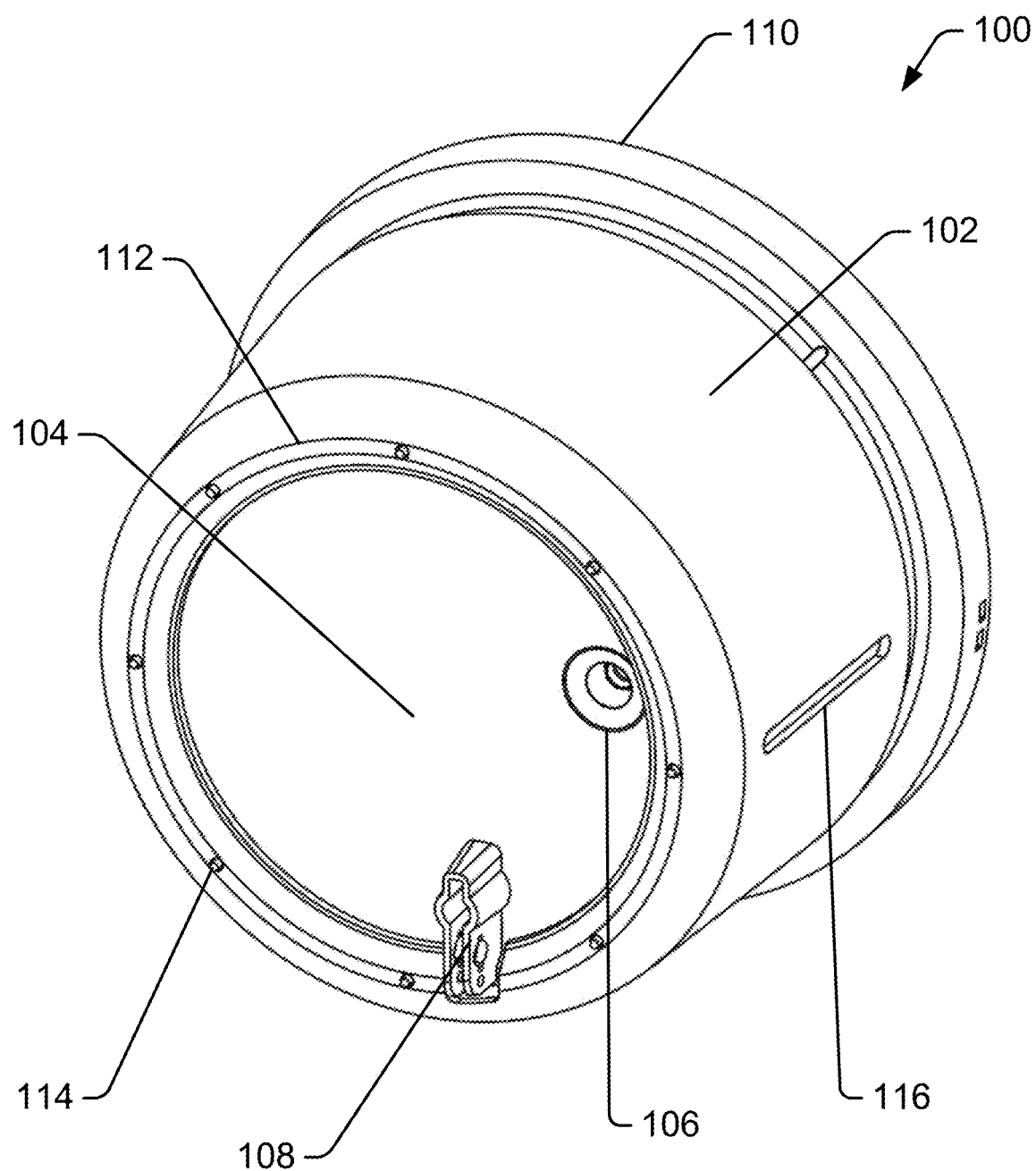
FIG. 1B is perspective view of an example of a metering device with a solar shield and an enclosure shown in an assembled configuration.

FIG. 1B shows an example of a metering device 100. In the example, the solar shield 102 and an enclosure are shown in an assembled configuration. The meter 100 may be configured to measure a consumable resource, such as electricity, natural gas, water, etc. In the example shown, a solar shield 102 covers at least part of an enclosure of the utility meter. (Because it is covered, the enclosure 101 is better seen in the views of FIGS. 1 and 3.) A face 104 of the enclosure may be transparent, to allow a user to see portions of a user interface, which may include a data display, and/or other output and/or input. The user interface may include a button 106 or other device to provide input, move a cursor, indicate selections, execute commands, perform a demand-reset, etc. A security device 108 provides tamper resistance and/or evidence. In an example, the device may show damage and/or alteration responsive to tampering with the enclosure and/or solar shield 102. Such evidence resists efforts of bad actors who may be trying to receive free resources.

In the example shown, the enclosure and/or the solar shield 102 may be attached to a base 110. The base 110 may be part of a meter-box (not shown) or other enclosure, or may be the back or rear portion of the meter 100. Accordingly, the meter-box or base 110 may be attached to a structure, such as an outside wall of a customer's residence or business.

The example solar shield 102 may be connected to the enclosure and/or base by appropriate fasteners, as indicated by the materials used, design cost targets, etc. In the example shown, the solar shield includes a flange 112 that wraps about a perimeter portion of the face 104 of the enclosure. The flange may include a plurality of heat-stake fasteners 114, which may be ultrasonically welded to the enclosure. Other fasteners, such as adhesives, mechanical fasteners, friction fittings, etc., may be used.

The solar shield may be made of metal, plastic (e.g., acrylonitrile butadiene styrene or polycarbonate) or other material. The solar shield may be painted or coated to improve its ability to reflect sunlight and/or its mean time between failures.

At least one opening, such as slot 116, may be defined in the solar shield 102. In an example, a similar slot (not shown) may be defined on the other side of the solar shield. The slot 116 (and additional slots or openings, if available) may allow air from the atmosphere to ventilate an air pocket defined between the solar shield 102 and the enclosure. (The air pocket is better seen in FIG. 7, and the enclosure is better seen in FIG. 3.) In an example, air enters one slot (e.g., slot 116), passes through the air pocket, and exits the other slot. The air absorbs heat as it moves through the air pocket, and thereby cools the utility meter 100 by convection.

Figure 2:
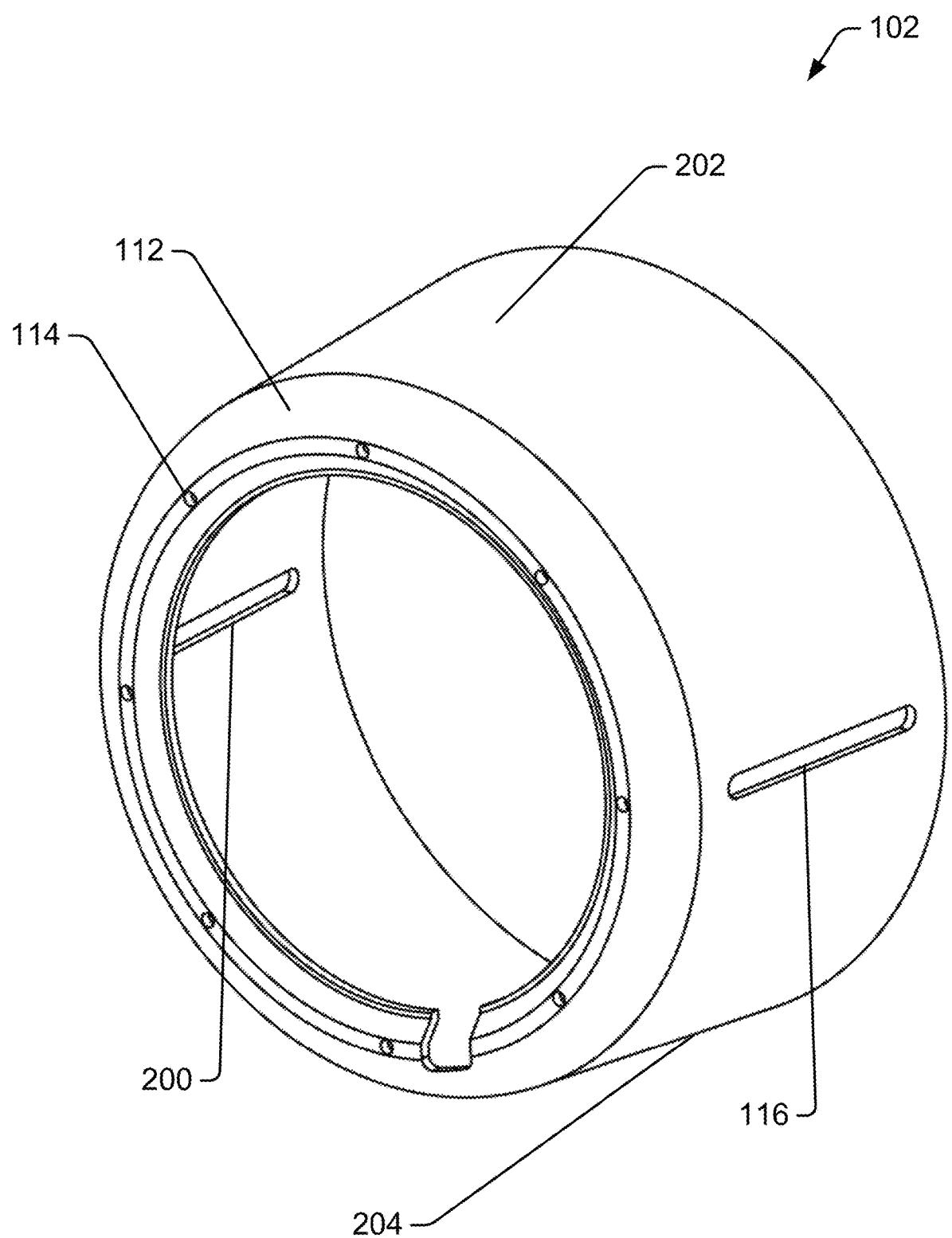
FIG. 2 is a perspective view of an example solar shield usable with a metering device.
Figure 3:
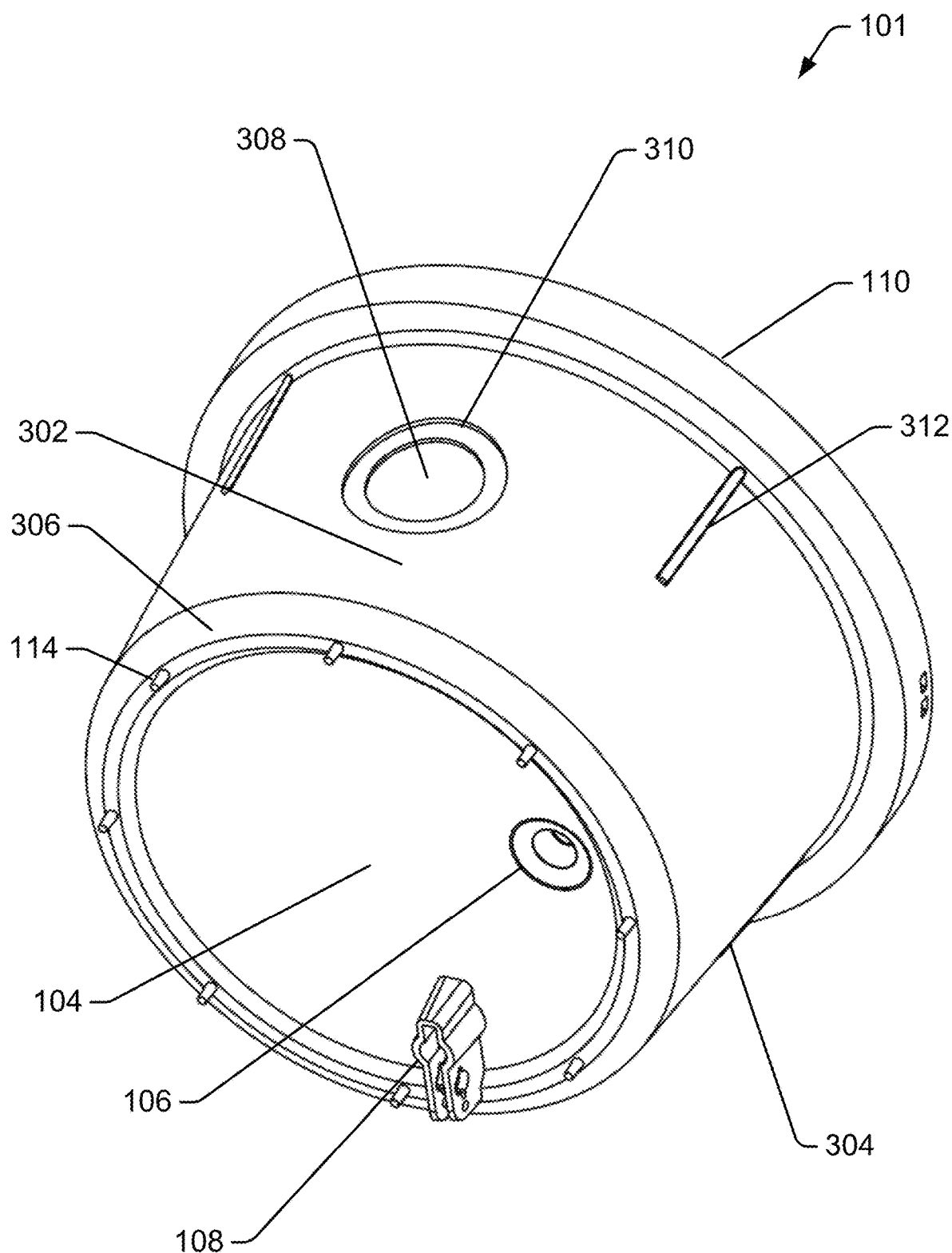
FIG. 3 is a perspective view of an example enclosure of a metering device, showing an opening defined in an upper surface of the enclosure.

FIG. 2 shows an example of a solar shield 102 not yet installed on an enclosure. In the example shown, left and right slots 116, 200 allow ventilation between the atmosphere and an air pocket defined between the solar shield 102 and the enclosure (e.g., as seen in FIG. 3). The ventilation allows cooler air from the atmosphere to replace warmer air in the air pocket. While two slots 116, 200 are shown, a different number of slots may be defined in the solar shield 102 and used to ventilate the air pocket. The use of two slots 116, 200 provides cross-ventilation, which may result in more air movement than a single slot.

The solar shield 102 has an upper surface 202 and a lower surface 204. In the example shown, the upper and lower surfaces are not slotted, to avoid having a slot in the solar shield 102 that is directly above or below the air passages and/or filters defined in the enclosure. Accordingly, the solar shield provides protection to air passages and/or filters defined in the enclosure. However, in an alternative example, the slots 116, 200 could be defined in the upper and lower surfaces 202, 204 to increase passive air flow and convection heat transfer from the air pocket.

The flange 112 carrying fasteners 114 allows connection between the solar shield 102 and the enclosure.

FIG. 3 shows portions of the utility meter 100. In the example shown, an enclosure 101 of a metering device is exposed prior to attachment of the solar shield. The enclosure may attach to a base 110, which may be part of a further enclosure portion (e.g., a sheet metal box) that contains additional components, such as metrology devices, radio and computing electronics, voltage regulator(s), direct current power supplie(s), etc.

In the example shown, an upper surface 302 and a lower surface 304 of the enclosure 101 are slightly tapered, to facilitate component removal from a mold in a plastic part manufacturing process. A flange 306 may contain one or more fasteners 114, to facilitate attachment of an inside surface of the solar shield to the outside surface of the enclosure 101.

In the example shown, a hole or opening 308 is defined in the upper surface 302 of the enclosure 101. The opening 308 (alone, or together with other such openings, e.g., opening associated with filter 500 of FIG. 6) may be sized to allow air flow sufficient to remove heat produced by components within the enclosure (e.g., by convective heat transfer of moving air) while keeping the components below a rated operational temperature. The opening 308 may be bordered by a recessed perimeter region 310. The recessed perimeter region 310 may be sized to allow fastening of a filter (e.g., filter 400 of FIG. 4) to the enclosure 101.

A rib 312 may be present on the outer surface of the enclosure 101, and provides added strength to the enclosure.

Figure 4:
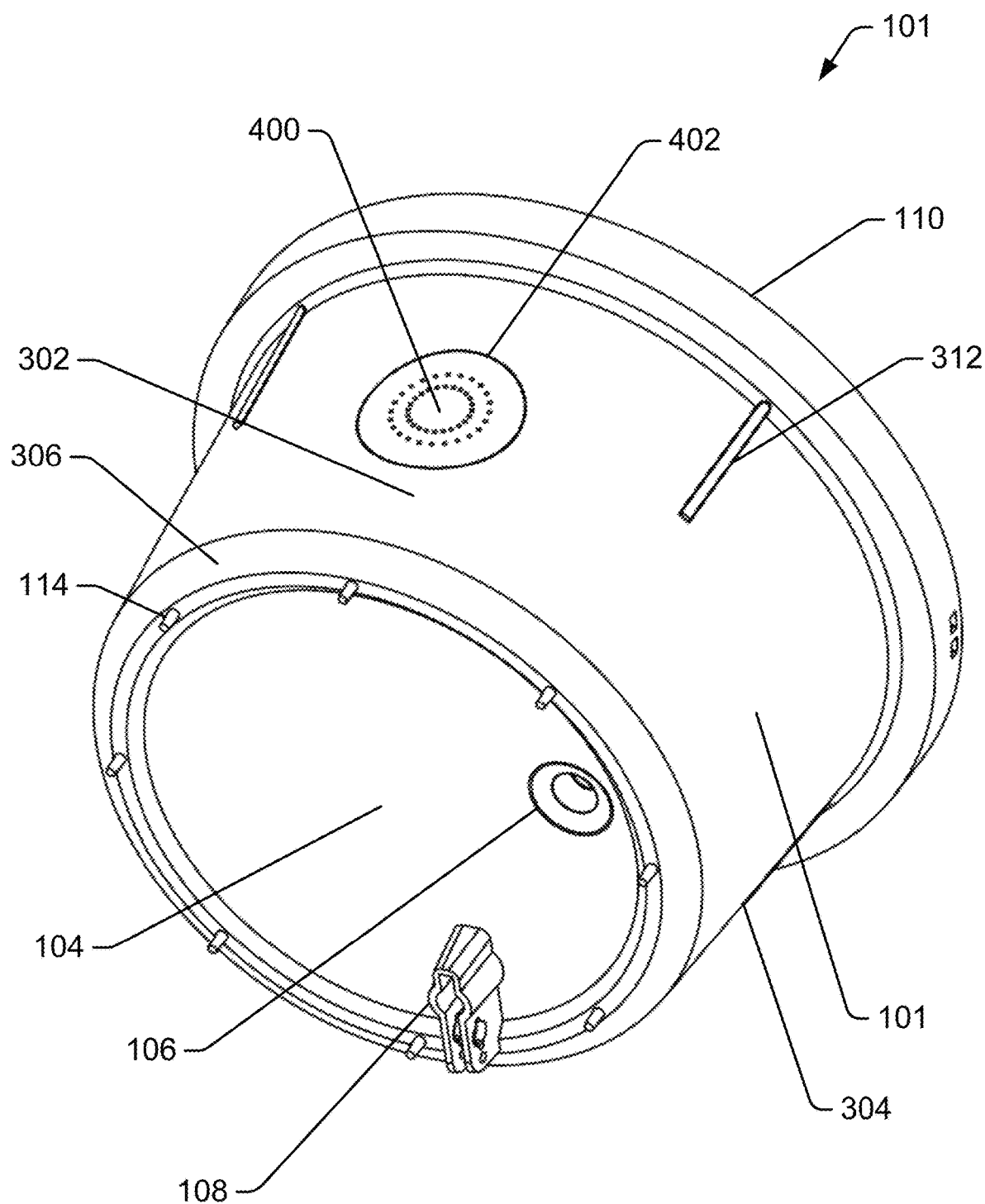
FIG. 4 is a perspective view of an example enclosure of a metering device, showing a filter installed in the opening defined in an upper surface of the enclosure.

FIG. 4 shows the enclosure 101 of a metering device having a filter 400 installed in the opening 308 (seen in FIG. 3) defined in the upper surface 302 of the enclosure. In representative but not exhaustive examples, the filter 400 may be installed by a heating/welding process, a friction-fit, the use of glues, adhesives, heat staking or thermoplastic staking, and/or chemical fastening means, etc. In the example shown, a perimeter 402 of the filter 400 is glued to the recessed perimeter region 310 (seen in FIG. 3) of the of the opening 308 (also seen in FIG. 3).

The filter 400 may be hydrophobic to prevent entry of water, while allowing air to enter and/or leave the enclosure 101, and to thereby exhaust heat by convection. The filter 400 may also be configured to inhibit, reduce and/or reject dust, insects, water, contaminants, and/or other foreign material.

In a representative example, the filter 400 may be made of a material comprising or including polytetrafluoroethylene (PTFE). Materials based on PTFE are sold under several well-known trade names, and prevent water, insects, dust, etc., while allowing the passage of air.

Figure 5:
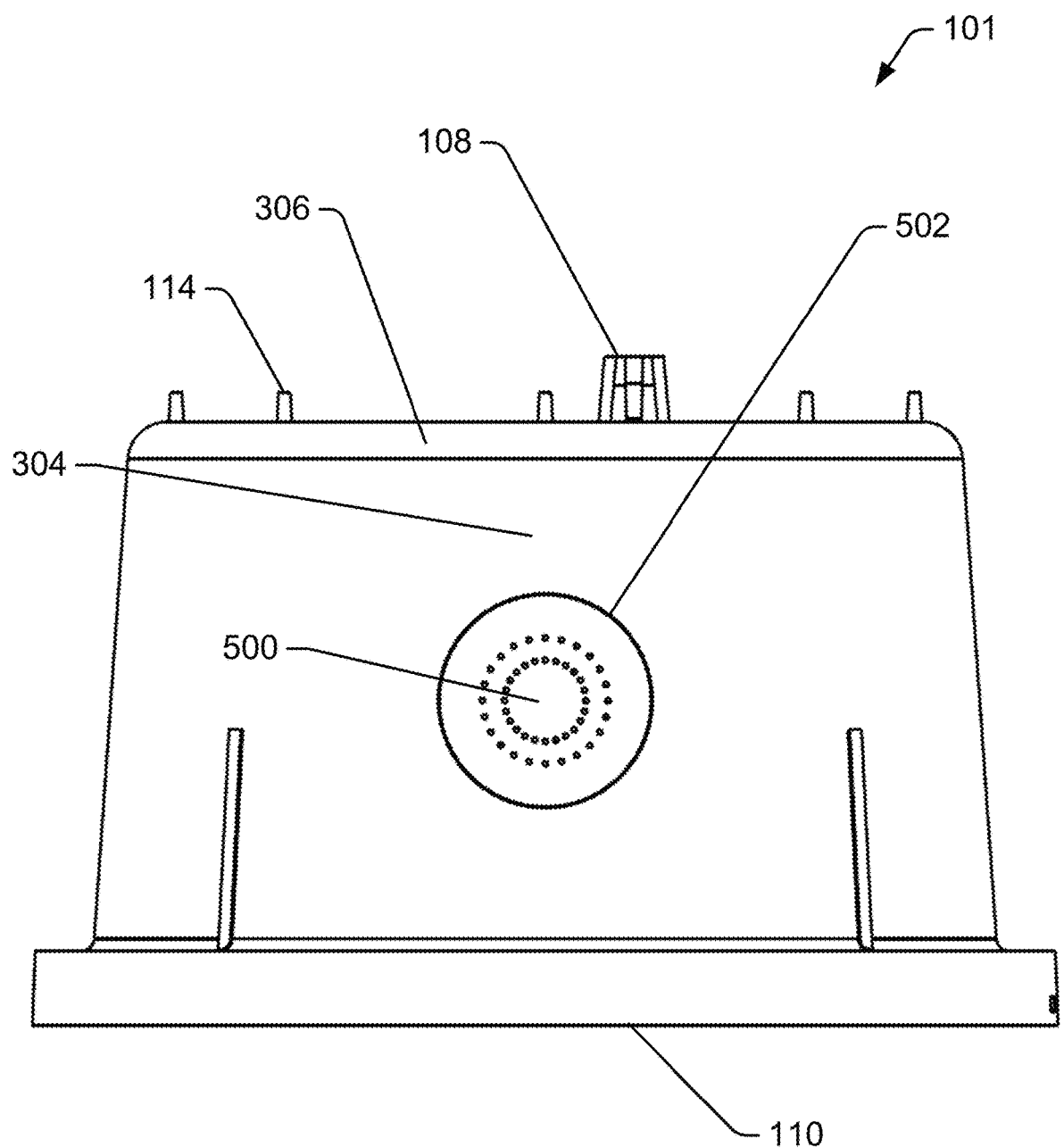
FIG. 5 is a plan view of an upper surface of an example enclosure of a metering device, showing a filter installed in an opening defined in the lower surface.

FIG. 5 shows the lower surface 304 of an enclosure 101 of a metering device. In the example, a filter 500 is installed in an opening (e.g., opening 718 in FIG. 7) defined in the lower surface 304. A perimeter 502 of the filter 500 may be supported by the recessed perimeter region (e.g., similar to region 310 in the upper surface 302, seen in FIG. 3). The base 110 may be in communication with a further enclosure, such as a utility meter box (not shown).

Figure 6:
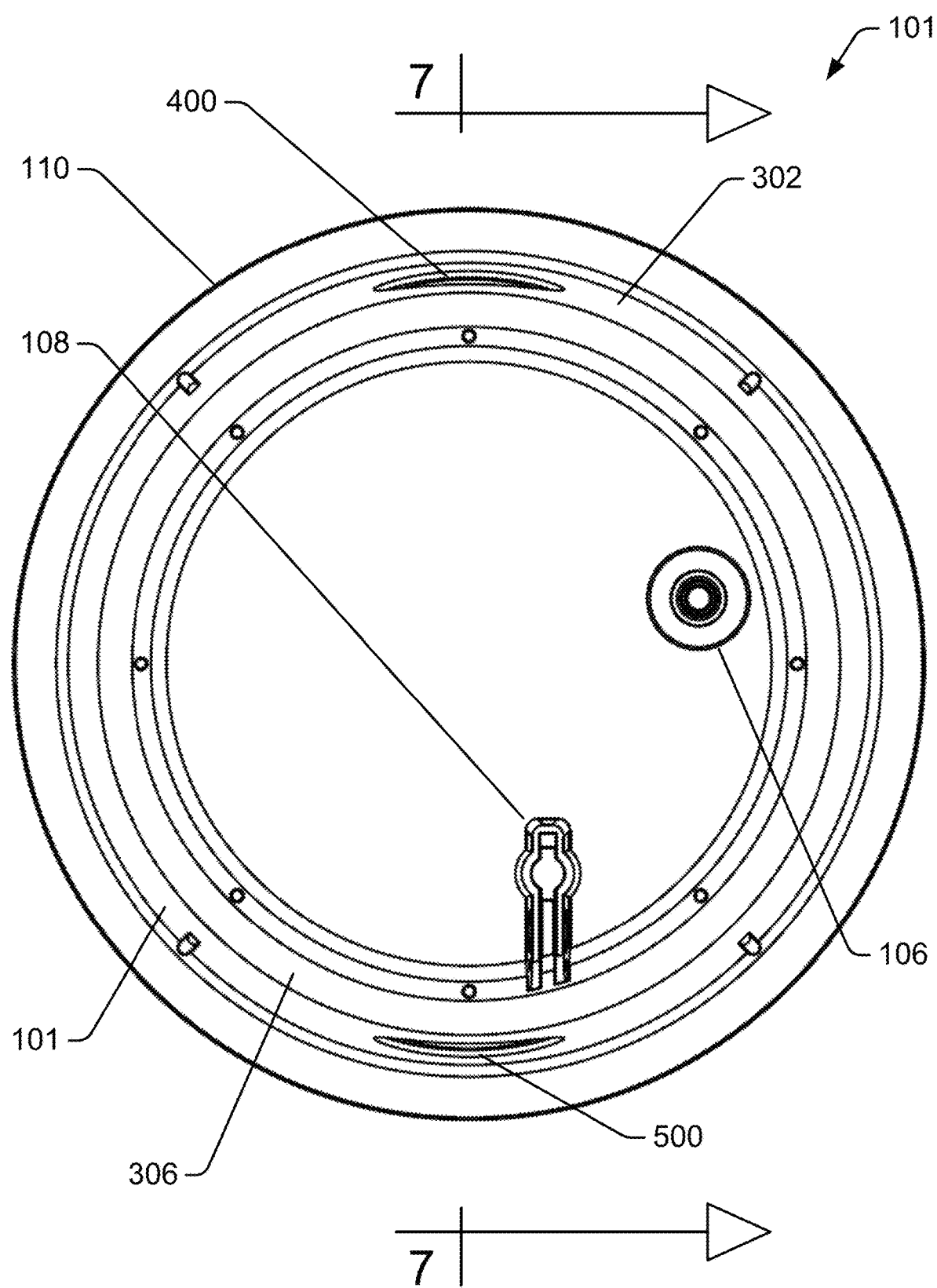
FIG. 6 is a view of a front of an example metering device.

FIG. 6 shows a metering device 100 with the solar shield removed to allow view of the enclosure 101 and upper filter 400 and lower filter 500. The upper filter 400 and lower filter 500 are disposed on or in openings or holes defined in the enclosure 101. While shown as upper and lower filters that are diametrically opposed about the enclosure, the location of the filters and associated openings in the enclosure may be varied as indicated by particular design requirements. The filters reject water, insects, dust and other materials, but allow the passage of air. Moreover, the upper filter 400 and a lower filter 500, acting in combination, provide better ventilation than a single filter. In some instances, air is heated by electronic components within the enclosure 101. The heated air is exhausted through the upper filter 400. As the heated air exits, cooler air enters the enclosure through filter 500. Accordingly, air is exchanged between the air pocket defined between the solar shield and the enclosure 101, which cools components within the enclosure by convection-cooling.

Figure 7:
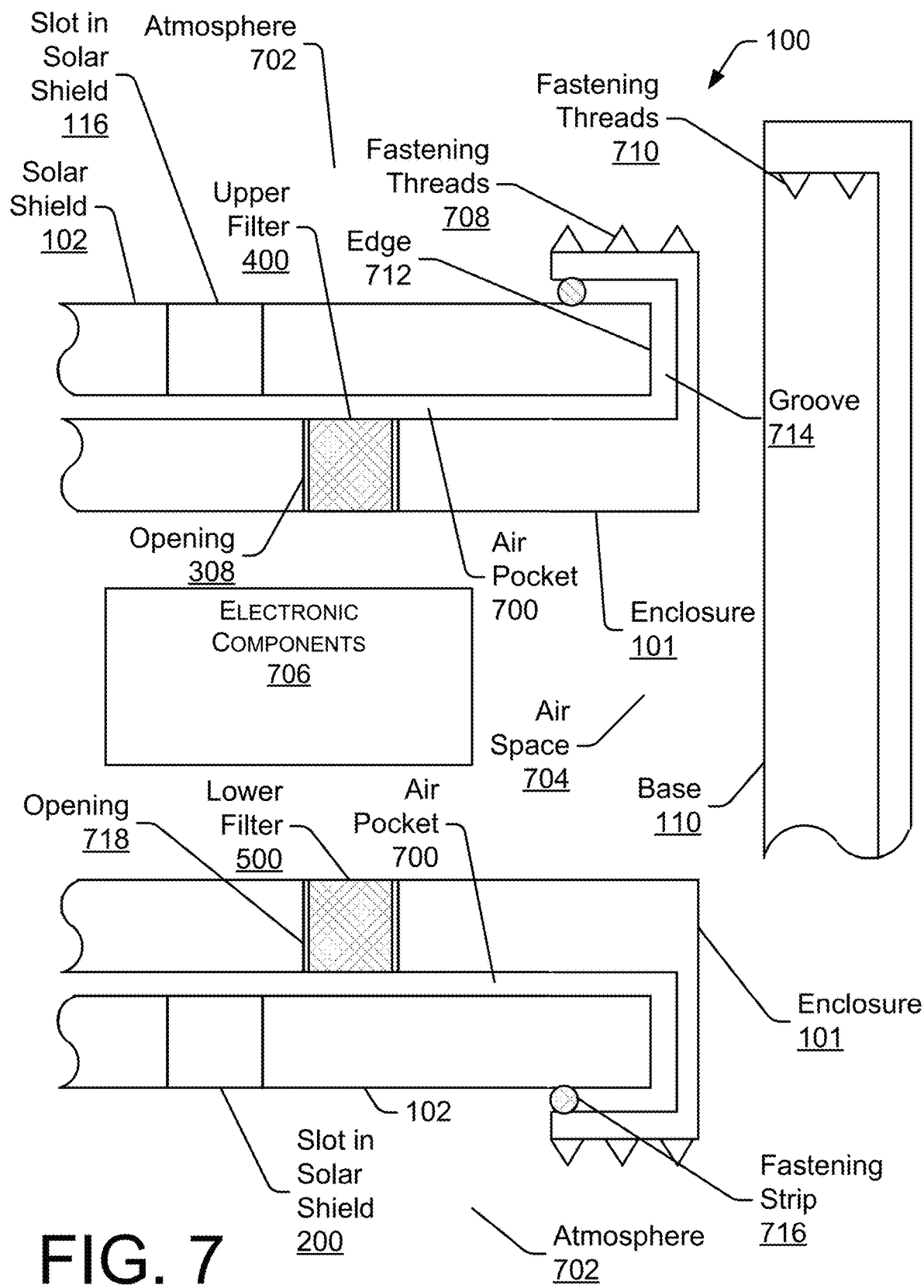
FIG. 7 is a simplified cross-sectional diagram showing an example relationship between a solar shield, an enclosure, and a base of a metering device having an orientation according to line 7-7 shown in FIG. 6.

If the solar shield 102 of FIG. 1A was present in the view of FIG. 6, the solar shield would cover the filter 400 disposed in or over the opening 308 (as seen in FIGS. 4 and 3, respectively) and would cover the filter 500 disposed in or over an opening 718 (as seen in FIGS. 6 and 7, respectively).

FIG. 7 shows an example relationship between a solar shield 102, an enclosure 101, and a base 110 of a metering device 100. The enclosure 101 and base 110 are taken from the perspective of the 7-7 cross-sectional indicators shown in FIG. 6. However, FIG. 6 does not show the solar shield 102 shown in FIG. 7.

FIG. 7 shows an air pocket 700 defined between the enclosure 101 and solar shield 102. The air pocket 700 exchanges air with the atmosphere 702 and an air space 704 defined by, and contained within, the enclosure 101. In the example shown, cooler air from the atmosphere passes through a slot 200 defined in the solar shield 102 and into the air pocket 700. Air from the air pocket 700 is drawn through a filter 500 and into the air space 704 within the enclosure 101. The filter 500 may be define on the bottom of the enclosure, as seen in FIGS. 5 and 6, and may be disposed in or on the opening 718. Air within the air space 704 is heated by operation of components 706 (e.g., metrology and radio components). Heated air leaves the air space 704, through filter 400 of the enclosure 101 and into the air pocket 700 defined between the enclosure 101 and the solar shield 102. Air leaves the air pocket 700 and into the atmosphere 702 through the slot 116 defined in the solar shield 102.

FIG. 7 shows an example fastening structure to connect the enclosure 101 to the base 110. Threaded fasteners 708, 710 allow the connection, typically using less than a full revolution. Other fastening means, such as friction fit, snap fit, adhesive, etc., could be substituted.

In the example shown, an edge 712 solar shield 102 is carried by a groove 714 defined in the enclosure 101. In an alternative structure, the groove 714 could be defined in the base 110. In a still further alternative structure, the groove 712 could be defined in a region between the enclosure 101 and base 110. In a still further alternative structure, the groove 714 may be circular, ring or loop-shaped, and may be formed in the base, enclosure and/or area therebetween, and may be formed around at least a portion of a periphery of the base and/or enclosure. As seen in FIG. 7, an arrangement of the groove 714, the edge 712 of the solar shield 102, and the enclosure 101 may provide opening(s) to allow air movement between the air pocket 700 and atmosphere 702.

In an example, a flexible strip and/or a fastening strip 716 provides a secure and water-tight seal between the solar shield 102 and the enclosure 101. The fastening strip 716 may be resiliently deformable, and made of a material such as rubber, synthetic rubber, caulk, etc.

In an example, heat transfer by air movement and convection removes heat created by operation of electronic components 706 and incoming sunlight. In the example, air moves from the atmosphere through the slot 200 in the solar shield 102, thereby entering the air pocket 700. Air moves from the air pocket 700 through the filter 500 in the opening 718, thereby entering the enclosure 101. In the enclosure, air is warmed by the electronic components 706. Warmed air moves from within the enclosure through the upper filter 400 of opening 308 and into the air pocket 700. Air moves from the air pocket through slot 116 in the solar shield and into the atmosphere. Accordingly, heat is dissipated from the metering device 100 by air movement and convention. Additionally, less of the energy present in sunlight warms the components 706, because of the existence of the solar shield 102, which protects the enclosure 101.

Figure 8:
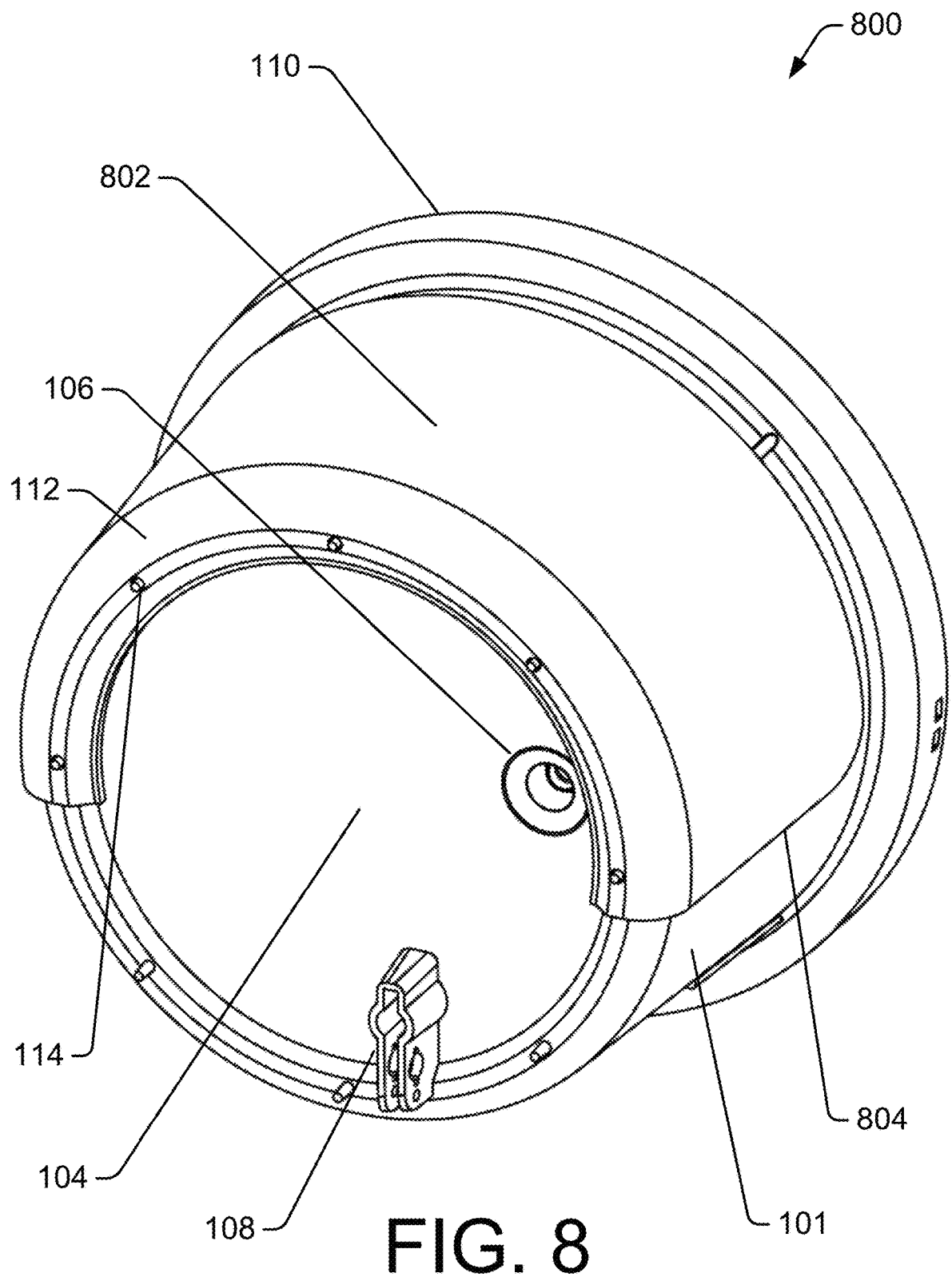
FIG. 8 is a perspective view of an example metering device having a solar shield configured to shade an upper portion of an enclosure of the metering device.

FIG. 8 shows portions of a metering device 800 having a solar shield 802 configured to shade an upper portion of an enclosure 101 of the metering device. Accordingly, the solar shield may cover (if present) a filter 400 disposed in or over an opening 308 (as seen in FIGS. 4 and 3, respectively). The partial and/or upper solar shield 802 may be approximately concentric with portions of the enclosure 101. The solar shield 802 protects the upper portion of the enclosure from sunlight, and protects filters mounted to cover openings or holes defined in the enclosure. The filters are thereby protected from sunlight, rain, and other environmental hazards. The solar shield also provides evidence of tampering, if it is removed and/or damaged.

The solar shield 802 is separated slightly from the enclosure 101, to thereby create an air pocket between them. The air within the enclosure is ventilated to the air pocket, and the air in the air pocket is ventilated to the atmosphere.

To promote and allow convection cooling, including ventilation between the air pocket and the atmosphere, the edge 804 of the solar shield 802 is separated slightly from the enclosure 101. The separation creates a gap or passage (or left and right passages) that allows air exchange between the air pocket between the solar shield and the atmosphere. Accordingly, openings defined between the edge 804 of the solar shield and the enclosure 101 allow air movement between the air pocket (e.g., air pocket 700 of FIG. 7) and the atmosphere.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A metering device, comprising:
   an enclosure having an upper surface, wherein the enclosure defines an opening to allow air movement between an interior of the enclosure and an air pocket;
   a base coupled to the enclosure to support the enclosure;
   a groove defined in the base;
   a solar shield, to cover at least the upper surface of the enclosure, wherein an edge of the solar shield is positioned within the groove, and wherein the solar shield is spaced a distance from the base such that the air pocket is located between the solar shield and the upper surface of the enclosure; and
   a filter disposed in the opening to block contaminants from passing through the opening.
2. The metering device as recited in claim 1, wherein:
   the edge of the solar shield is spaced from the base such that at least one passage is formed between the edge of the solar shield and the base to allow air movement between the air pocket and atmosphere.
3. The metering device as recited in claim 1, wherein:
   left and right edges of the solar shield are spaced a second distance from the enclosure to define left and right passages, respectively, to allow air exchange between atmosphere and the air pocket.
4. The metering device as recited in claim 1, additionally comprising:
   a fastener to connect the solar shield to the enclosure, the fastener being configured to provide tamper evidence responsive to at least partial removal of the solar shield from the enclosure.
5. The metering device as recited in claim 1, wherein the opening is a first opening and the filter is a first filter, and wherein the metering device additionally comprises:
   a second opening defined in the enclosure, wherein the second opening allows air movement between atmosphere and the interior of the enclosure; and
   a second filter to block contaminants from passing through the second opening.
6. A metering device, comprising:
   an enclosure having an upper surface;
   a base to support the enclosure;
   a solar shield, to cover the upper surface of the enclosure, wherein the solar shield is spaced a distance from the upper surface of the enclosure such that an air pocket is formed between the solar shield and the upper surface of the enclosure;
   a first opening defined in the enclosure located to allow airflow to the air pocket; and
   a second opening defined in a portion of the enclosure not covered by the solar shield.

7. The metering device as recited in claim 6, additionally comprising:
a groove shaped as a ring and formed in the base; and
an edge of the solar shield located within the groove.

8. The metering device as recited in claim 6, additionally comprising:
a groove defined in the base; and
an edge of the solar shield located within the groove.

9. The metering device as recited in claim 6, wherein:
left and right edges of the solar shield are spaced a distance from the enclosure to define left and right passages, respectively, to allow air exchange between atmosphere and the air pocket.

10. The metering device as recited in claim 6, additionally comprising:
a first filter to inhibit contaminants from passing through the first opening; and
a second filter to inhibit contaminants from passing through the second opening.

11. A metering device, comprising:
an enclosure, having at least some transparent regions;
a base, connected to and supporting the enclosure;
a solar shield, attached to at least one of the enclosure and the base, and covering at least an upper surface of the enclosure, wherein:
the solar shield is spaced a distance from the base such that an air pocket is formed between the solar shield and the upper surface of the enclosure; and
an edge of the solar shield is spaced from the base such that at least one passage is formed between the edge of the solar shield and the base to allow air movement between the air pocket and atmosphere;
a first side opening defined in the solar shield and a second side opening defined in the solar shield to allow air movement between the air pocket and the atmosphere;
an opening defined in the enclosure to allow air movement between an interior of the enclosure and the air pocket, wherein the opening allows airflow between the enclosure and the air pocket; and
a filter to block contaminants from passing through the opening.

12. The metering device as recited in claim 11, additionally comprising:
a groove defined in the base; and
the edge of the solar shield located within the groove;
wherein the groove separates at least some of the solar shield from the enclosure to provide space for air to move into the first side opening, through the air pocket, and out of the second side opening.

13. The metering device as recited in claim 11, wherein:
left and right edges of the solar shield are spaced a distance from the enclosure to define left and right passages, respectively, to allow air exchange between the atmosphere and the air pocket.

14. The metering device as recited in claim 11, wherein the solar shield is made of acrylonitrile butadiene styrene or polycarbonate.

15. The metering device as recited in claim 11, additionally comprising:
a groove defined in the base, wherein the edge of the solar shield is located within the groove; and
a fastening strip to secure the edge of the solar shield within the groove.

16. The metering device as recited in claim 11, wherein the opening is an upper opening and the filter is a first filter, and wherein the metering device additionally comprises:
a lower opening defined in the enclosure, wherein the lower opening allows air movement between the atmosphere and the interior of the enclosure; and
a second filter to block contaminants from passing through the lower opening.

17. A metering device, comprising:
an enclosure having an upper surface;
a base coupled to the enclosure to support the enclosure;
a groove defined in the base;
a solar shield, to cover at least the upper surface of the enclosure, wherein an edge of the solar shield is positioned within the groove;
a first opening defined in the enclosure, wherein the first opening allows air movement between an interior of the enclosure and an air pocket defined between the solar shield and the upper surface of the enclosure;
a first filter to block contaminants from passing through the first opening;
a second opening defined in the enclosure, wherein the second opening allows air movement between atmosphere and the interior of the enclosure; and
a second filter to block contaminants from passing through the second opening.

18. A metering device, comprising:
an enclosure having an upper surface;
a base to support the enclosure;
a solar shield, to cover at least the upper surface of the enclosure, wherein the solar shield is spaced a distance from the base such that an air pocket is formed between the solar shield and the upper surface of the enclosure;
at least one opening defined in the enclosure, to allow air movement between the air pocket and atmosphere;
an upper opening defined in the enclosure, wherein the upper opening allows air movement between an interior of the enclosure and the air pocket;
a first filter to inhibit contaminants from passing through the upper opening;
a lower opening defined in the enclosure, wherein the lower opening allows air movement between the atmosphere and the interior of the enclosure; and
a second filter to inhibit contaminants from passing through the lower opening.

19. A metering device, comprising:
an enclosure, having at least some transparent regions;
a base, connected to and supporting the enclosure;
a solar shield, attached to at least one of the enclosure and the base, and covering at least an upper surface of the enclosure, wherein:
the solar shield is spaced a distance from the base such that an air pocket is formed between the solar shield and the upper surface of the enclosure; and
an edge of the solar shield is spaced from the base such that at least one passage is formed between the edge of the solar shield and the base to allow air movement between the air pocket and atmosphere;
a first side opening defined in the solar shield and a second side opening defined in the solar shield to allow air movement between the air pocket and the atmosphere;
an opening defined in the enclosure to allow air movement between an interior of the enclosure and the air pocket, wherein the opening allows airflow between the enclosure and the air pocket; and
a filter to block contaminants from passing through the opening;
an upper opening defined in the enclosure, wherein the upper opening allows air movement between the interior of the enclosure and the air pocket;

a first filter to block contaminants from passing through the upper opening;

a lower opening defined in the enclosure, wherein the lower opening allows air movement between the atmosphere and the interior of the enclosure; and a second filter to block contaminants from passing through the lower opening.

\* \* \* \* \*